US008766878B2

(12) United States Patent
Hong

(10) Patent No.: US 8,766,878 B2
(45) Date of Patent: Jul. 1, 2014

(54) INTEGRAL PHOTOGRAPHY TYPE THREE-DIMENSIONAL DISPLAY DEVICE

(75) Inventor: Hyung Ki Hong, Seoul (KR)

(73) Assignee: LG Display Co. Ltd., Seoul (KR)

( * ) Notice: Subject to any disclaimer, the term of this patent is extended or adjusted under 35 U.S.C. 154(b) by 1395 days.

(21) Appl. No.: 11/965,341

(22) Filed: Dec. 27, 2007

(65) Prior Publication Data

US 2009/0009425 A1 Jan. 8, 2009

(30) Foreign Application Priority Data

Jul. 2, 2007 (KR) .................. 10-2007-0066194

(51) Int. Cl.
*G09G 5/00* (2006.01)
*G09G 3/36* (2006.01)
*H04N 13/04* (2006.01)
*G02B 27/22* (2006.01)
*G02F 1/1335* (2006.01)

(52) U.S. Cl.
CPC ...... *G02B 27/2292* (2013.01); *G02F 1/133504* (2013.01); *H04N 13/042* (2013.01); *G02B 27/2214* (2013.01)
USPC .................. 345/6; 345/87; 345/102; 345/419

(58) Field of Classification Search
USPC ..................... 345/6, 87, 102, 419, 9
See application file for complete search history.

(56) References Cited

U.S. PATENT DOCUMENTS

| 5,945,965 A * | 8/1999 | Inoguchi et al. ............ 345/6 |
| 7,775,666 B2 * | 8/2010 | Kubara et al. ............ 353/7 |
| 2004/0150583 A1 * | 8/2004 | Fukushima et al. ........ 345/6 |

OTHER PUBLICATIONS

F. Okana, et al. "Three-Dimensional Television System Based on Integral Photography", *Three-Dimensional Television, Video, and Display Technologies*, 1001-123,Springer 2002.

* cited by examiner

*Primary Examiner* — Amare Mengistu
*Assistant Examiner* — Jennifer Zubajlo
(74) *Attorney, Agent, or Firm* — Brinks Gilson & Lione

(57) ABSTRACT

A display device includes a display panel including first to fourth pixels in a first direction, wherein each of the first to fourth pixels has a first width in the first direction and a length more than the width and in a second direction; and a backlight unit including first and second line light regions supplying light to the display panel to display three-dimensional images, wherein the first and second line light regions have a slanted angle with respect to the second direction, wherein light from the first line light region comes to right and left eyes of a viewer through the first and second pixels, respectively, and light from the second light region comes to the right and left eyes through the third and fourth pixels, respectively, wherein the display device has K view points.

15 Claims, 8 Drawing Sheets

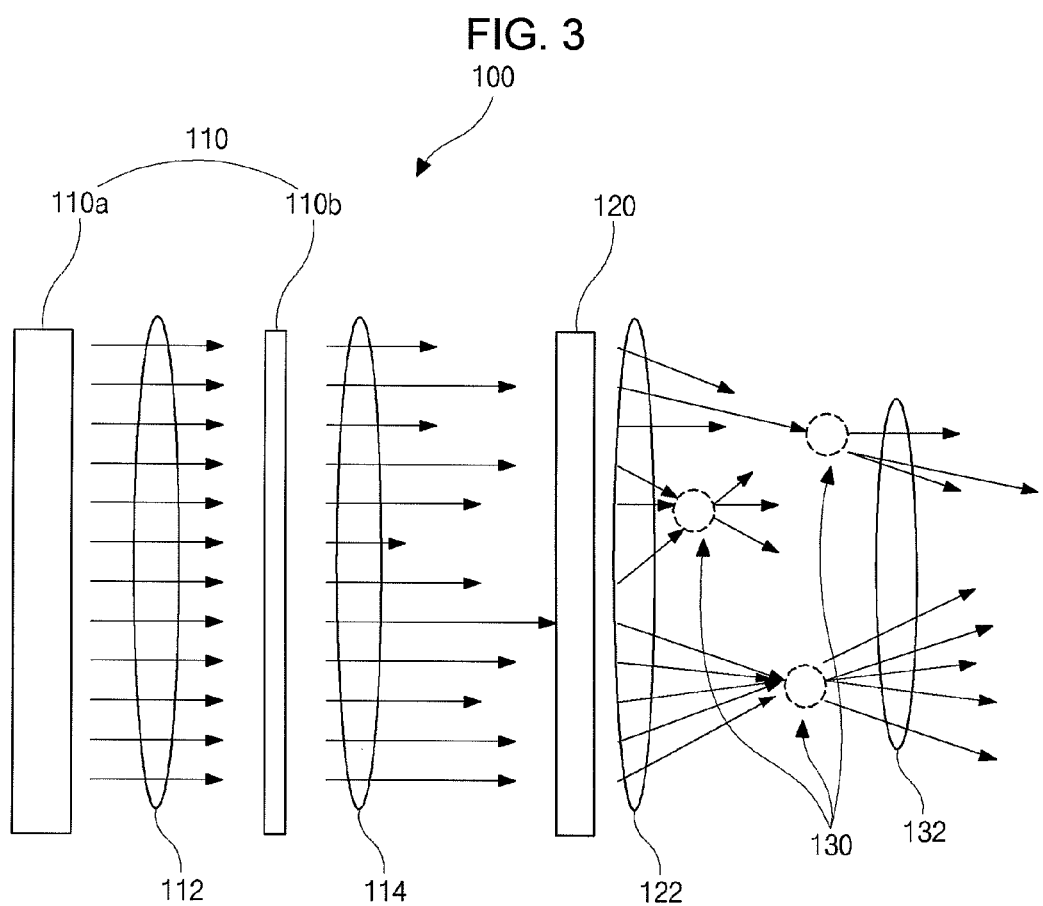

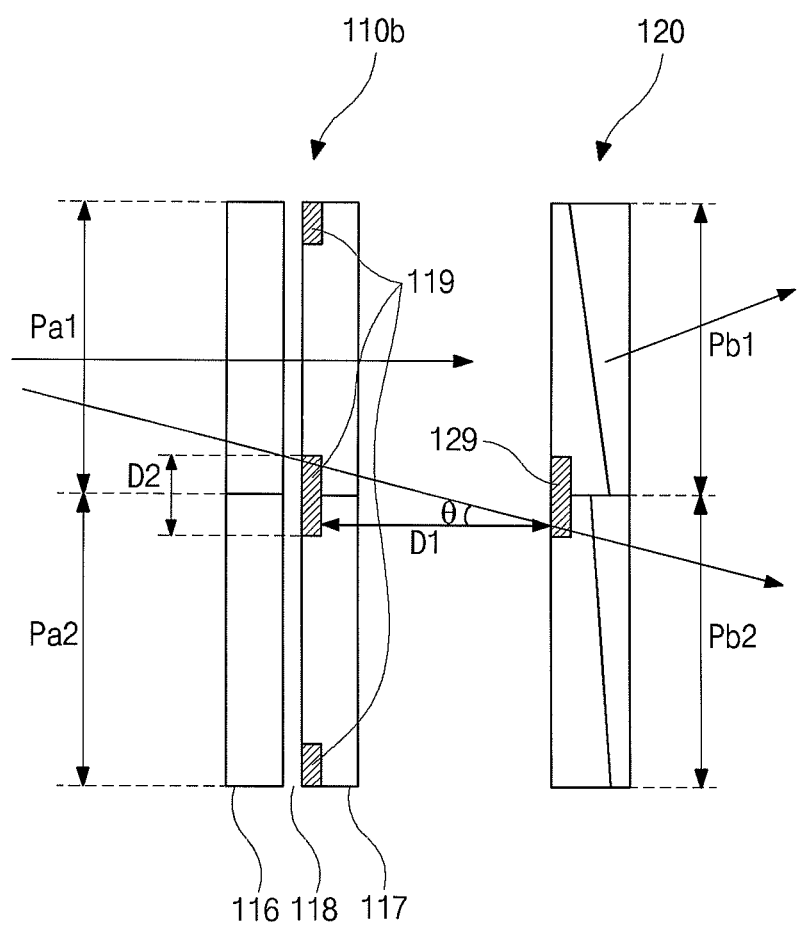

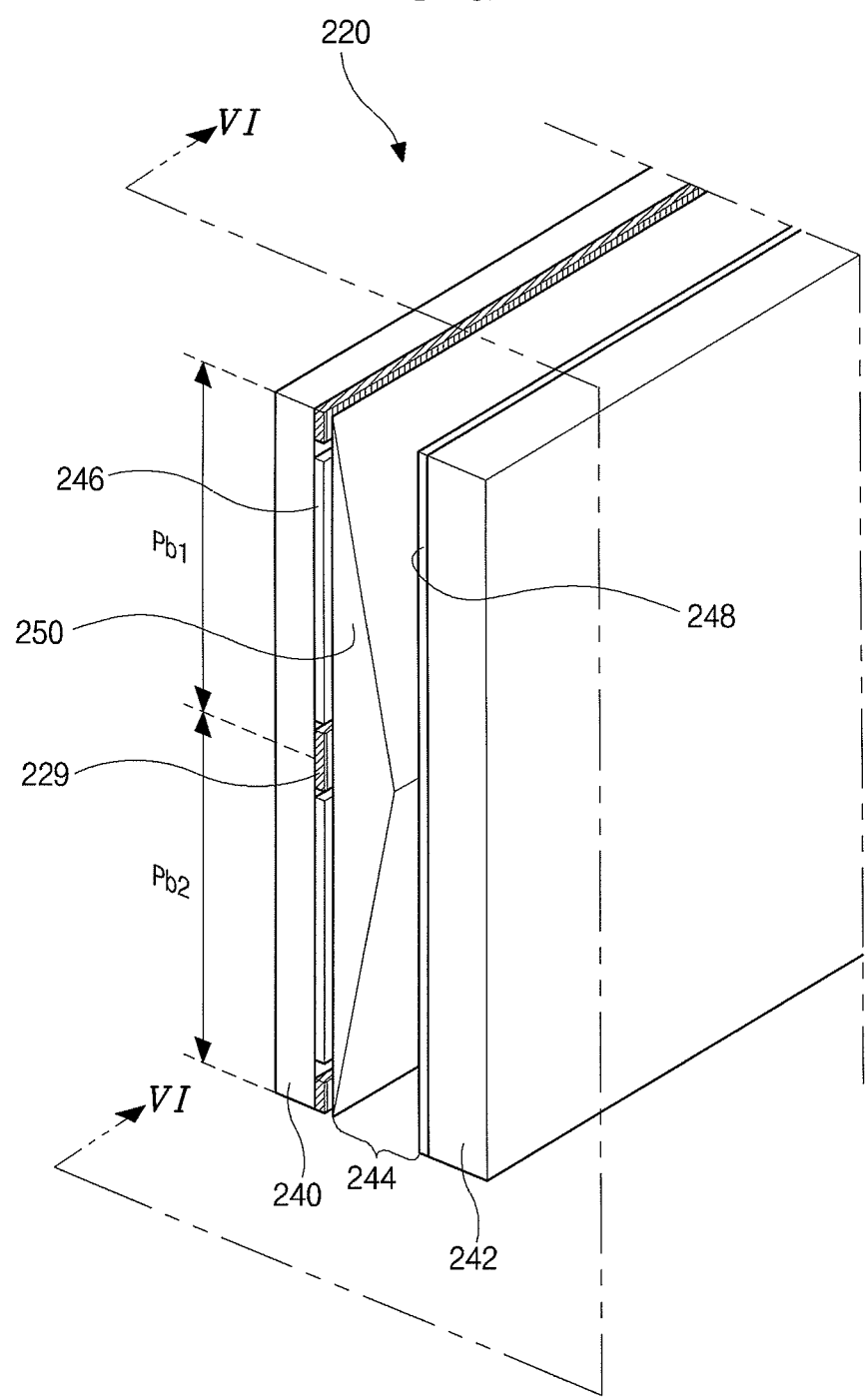

US 8,766,878 B2

INTEGRAL PHOTOGRAPHY TYPE THREE-DIMENSIONAL DISPLAY DEVICE

CLAIM FOR PRIORITY

This application claims the benefit of Korean Patent Application No. 10-2007-0066194, filed in Korea on Jul. 2, 2007, which is hereby incorporated by reference in its entirety.

BACKGROUND OF THE INVENTION

1. Field of the Invention

The invention relates to a three-dimensional display device, and in particular, an integral photography type three-dimensional display device.

2. Discussion of the Related Art

A two-dimensional display device is generally used. Recently, because of wideband communication networks, a three-dimensional display device has been researched and developed.

There are various types of three-dimensional image displays, for example, a holographic image type, a stereographic type, a volumetric type and the like.

The holographic type is used for a holographic image using a laser or a white ray.

The stereographic type display device displays a three-dimensional image using binocular parallax. The stereographic type display device includes a display device that uses specific glasses and a display device without glasses. The stereoscopic display devices without glasses are divided into a parallax barrier type, a lenticular type, and the like.

The volumetric type is used for three-dimensional computer graphics or an I-MAX movie. Of volumetric types, an integral photography type has advantage of identically reproducing optical properties, such as light distribution and brightness, of a real three-dimensional object and displaying a three-dimensional image perceived as the real three-dimensional object.

FIGS. 1A and 1B are views illustrating a principle of displaying a three-dimensional image in an integral photography type three-dimensional display device.

Referring to FIG. 1A, when there is a real three-dimensional object 50, the object 10 is perceived through rays 10a to 10f emitted from a surface of the object 10. In other words, external rays reflecting on the object 10 or rays radiating at the object 10 itself are emitted as the rays 10a to 10f from the object 10, and a viewer combines the rays 10a to 10f and perceives the object 10.

Referring to FIG. 1B, if a three-dimensional display device emits rays 20a to 20f which have the same light distribution and brightness as the rays 10a to 10f emitted from the surface of the object 10, the viewer combines the rays 20a to 20f from the display device and perceives a virtual object 20 as the object 10.

FIG. 2A is a view illustrating an image-taking device, and FIG. 2B is a view illustrating an integral photography type three-dimensional display device according to the related art.

Referring to FIG. 2A, the image-taking device 60 includes an image-taking lens array 62 and an image-taking panel 64. The image-taking lens array 62 includes a plurality of convex lens in a matrix form. The image-taking panel 64 has a plurality of pixels. The image-taking panel 64 uses a photograph for static images, and a CCD (charge-coupled device) for moving images.

An object 50 emits a plurality of rays 50a toward the image-taking lens array 62, and the rays 50a is condensed through the image-taking lens array 62 and recorded in the pixels of the image-taking panel 64.

The plurality of pixels of the image-taking panel 64 records a plurality of images 52 of the object viewed through the plurality of convex lens of the lens array 62, respectively. Accordingly, the image-taking device 60 takes image data for the object 50 viewed in various directions in space.

The image data are displayed by the integral photography type three-dimensional display device of FIG. 2B and combined by a viewer, and a three-dimensional image is perceived.

Referring to FIG. 2B, the integral photography type three-dimensional display device 70 includes a display panel 72 and a display lens array 74. The display panel 72 includes a plurality of pixels. The display panel 72 uses a photograph for static images, and a flat display panel for moving images. The display lens array 74 includes a plurality of convex lens in a matrix form in similar to the image-taking lens array 62.

The display panel 72 is supplied with the image data recorded by the image-taking device 60. The plurality of pixels of the display panel 72 display the plurality of images 52 of the object 50, respectively, using the image data. A plurality of rays 74 emitted from the plurality of pixels of the display panel 72 are condensed through the plurality of convex lens of the display lens array 74. The condensed plurality of rays 80a form a plurality of voxels (volume pixels). A plurality of partial images displayed at the plurality of voxels are integrated at a point and form an image 80 corresponding to the object 50 at a certain position in space.

Through these processes, the integral photography type three-dimensional display device 70 displays the three-dimensional image 80 identical to the object 50, and the viewer perceives as if the object 50 existed.

Because the integral photography type three-dimensional display device forms three-dimensional images in space, the integral photography type three-dimensional display device supplies continuous horizontal and vertical parallax, and single or multiple viewers view the three-dimensional images without specific glasses. However, because position of the voxels formed in space through the lens array is fixed, a depth range given to the displayed image is limited. This limitation is because the lens array of a passive lens type is used.

In other words, the lens array is fixed in the related art integral photography type three-dimensional display device, and position and property of the convex lens of the lens array is fixed. Accordingly, condensing direction and condensed position by the lens array is not actively control, and thus the depth range given to the displayed image is limited.

SUMMARY

An integral photography type three-dimensional display device is disclosed that includes a brightness control panel including a plurality of brightness pixels, wherein each of the plurality of brightness pixels control a brightness of a ray incident thereon; and a path control panel including a plurality of path pixels, wherein each of the plurality of path pixels control a path of the ray leaving each of the plurality of brightness pixels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 3 is a view illustrating an integral photography type three-dimensional display device according to a first embodiment of the disclosure;

FIG. 4 is a view illustrating parts of a brightness control panel and a path control panel of an integral photography type three-dimensional display device according to the first embodiment of the present disclosure;

FIG. 6A is a perspective view illustrating a path control panel of an integral photography type three-dimensional display device according to a second embodiment of the present disclosure.

DETAILED DESCRIPTION OF THE EMBODIMENTS

Figure 1A:
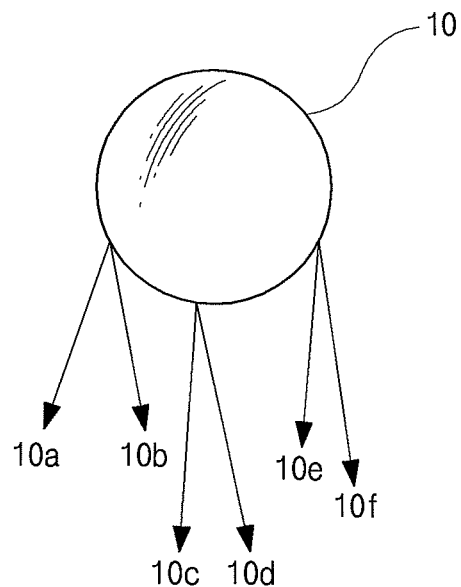
FIGS. 1A and 1B are views illustrating a principle of displaying a three-dimensional image in an integral photography type three-dimensional display device.
Figure 1B:
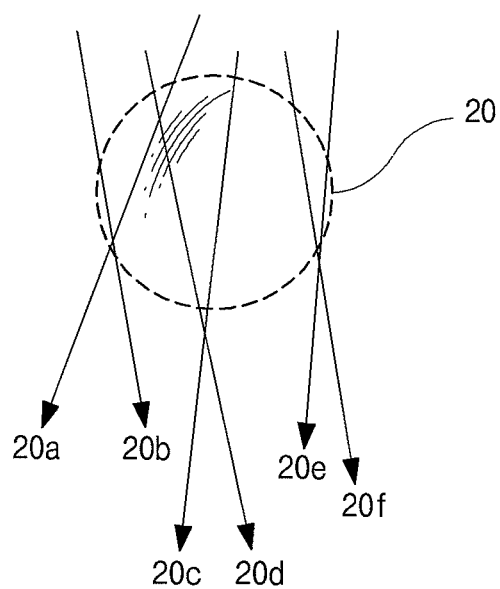
Figure 2A:
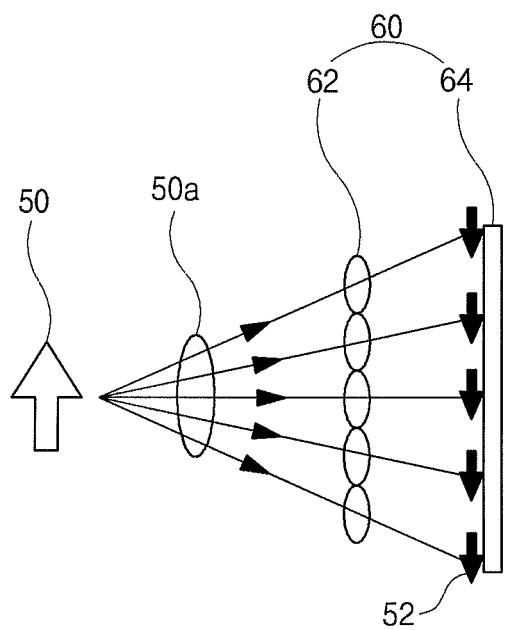
FIG. 2A is a view illustrating an image-taking device.
Figure 2B:
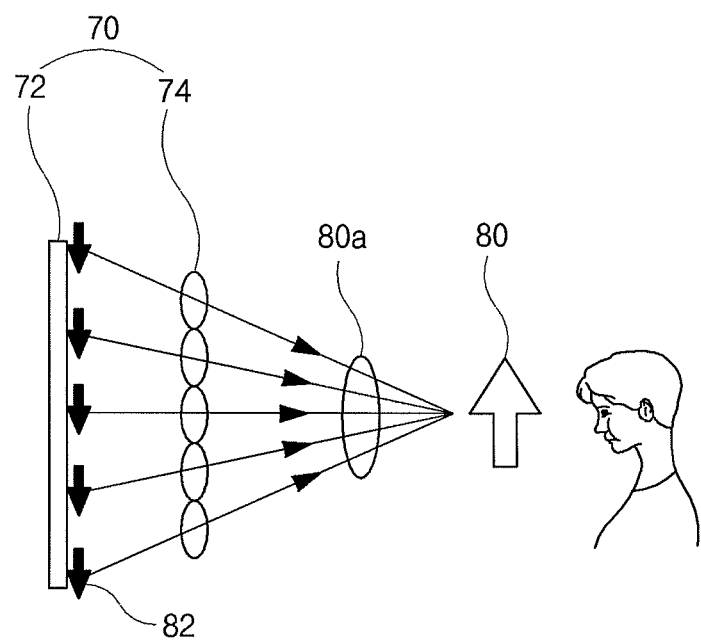
FIG. 2B is a view illustrating an integral photography type three-dimensional display device according to the related art.

Reference will now be made in detail to the illustrated embodiments of the present invention, which are illustrated in the accompanying drawings.

FIG. 3 is a view illustrating an integral photography type three-dimensional display device according to a first embodiment of the disclosure.

Referring to FIG. 3, the integral photography type display device 100 includes a brightness control panel 110 and a path control panel 120. The brightness control panel 110 may include a backlight unit 110a and a liquid crystal panel 110b including a plurality of pixels in a matrix form.

The brightness control panel 110 control brightness of a ray passing through each pixel.

To prevent interference by adjacent pixels, the backlight unit 110a has a high-condensing property so that a plurality of first rays 112 is emitted from the backlight unit 110a within about a 10 degree angle with respect to a perpendicular line to a plane of the liquid crystal panel 120a. Accordingly, the first rays 112 have uniform brightness and are incident on the liquid crystal panel 110b.

The liquid crystal panel 110b controls transmissivity of each pixel according to a corresponding first partial image data having brightness information. The first partial image data is supplied from an external driving circuit to the corresponding pixel. Accordingly, the plurality of pixels displays a plurality of partial images, respectively, having different brightness. In other words, the first ray 112 passes through the corresponding pixel of the liquid crystal panel 110b and becomes a second ray 114 corresponding to the partial image of the corresponding pixel.

In the first embodiment, the brightness control panel 110 includes the high-condensing backlight unit 110a and the liquid crystal panel 110b. Alternatively, other type of a bright control panel may be employed if it controls brightness of a ray at each pixel and the controlled ray is substantially perpendicularly incident on the path control panel 120. For example, a projector may be used as the brightness control panel.

The second ray 114 substantially perpendicularly leaving the corresponding pixel of the brightness control panel 110 may be substantially perpendicularly incident on the path control panel 120.

The path control panel 120 may include a plurality of pixels corresponding to the plurality of pixels of the brightness control panel 110, respectively. Accordingly, the second ray 114 of the partial image of the corresponding pixel of the brightness control panel 110 is incident on the corresponding pixel of the path control panel 120.

Because the partial images are incident on the corresponding pixels of the path control panel 120, interference by adjacent partial images may be prevented.

The path control panel 120 controls a path of the second ray 114 through the corresponding pixel according to a second partial image data. The second partial image data is supplied from an external driving circuit to the corresponding pixel. Accordingly, the plurality of pixels displays the plurality of partial images, respectively, having different paths. In other words, the path of the second ray 114 changes through the corresponding pixel of the path control panel 120, and the second ray 114 becomes a third ray 122 having the controlled brightness and path.

The third rays 122 having the brightnesses and paths corresponding to the partial images are condensed at certain points and form a plurality of voxels 130.

Because the pixels of the path control panel 120 control the paths of the third rays 122 according to the second partial image data corresponding to a real object, the plurality of voxels are formed at various depths of space, and a viewer perceives a three-dimensional image having natural depth information through the voxels 130 having the same optical property as the real object.

In other words, the plurality of third rays 122 forming the plurality of voxels 130 are transmitted to the viewer as a plurality of fourth rays 132 identical to rays of the real object, and the viewer perceives the three-dimensional image identical to the real object through the fourth rays 132.

FIG. 4 is a view illustrating parts of a brightness control panel and a path control panel of an integral photography type three-dimensional display device according to the first embodiment of the present disclosure.

Referring to FIG. 4, in the integral photography type three-dimensional display device, a liquid crystal panel 110b includes first and second brightness pixels Pa1 and Pa2, and a path control panel 120 includes first and second path pixels Pb1 and Pb2. The liquid crystal panel 110b includes first and second substrates 116 and 117 and a first liquid crystal layer 118 between the first and second substrates 116 and 117.

In order that a ray passing through the first brightness pixel Pa1 is incident on the first path pixel Pb1 and a ray passing through the second brightness pixel Pa2 is incident on the second path pixel Pb2, the first and second brightness pixels Pa1 and Pa2 correspond to the first and second path pixels Pb1 and Pb2, respectively.

The rays emitted from a backlight unit (110a of FIG. 3) pass through the first and second brightness pixels Pa1 and Pa2 and leave the liquid crystal panel 110b with separately controlled brightnesses according to corresponding partial images. Then, the rays pass through the first and second path pixels Pb1 and Pb2 and leave the path control panel 120 with separately controlled paths according to the corresponding partial images.

The integral photography type three-dimensional display device controls the rays passing through the corresponding pixels to have brightnesses and paths corresponding to the real object. To do this, partial image data having brightness information are supplied to the corresponding pixels of the brightness control panel (110 of FIG. 3), and partial image data having path information are supplied to the corresponding pixels of the path control panel 120.

In other words, the first brightness pixel Pa1 and the first path pixel Pb1 are supplied with partial image data having brightness information and path information, respectively, corresponding to one partial image. The second brightness pixel Pa2 and the second path pixel Pb2 are supplied with partial image data having brightness information and path information, respectively, corresponding to another partial image.

If a ray passing through the first brightness pixel Pa1 passes through the second path pixel Pb2 or a ray passing through the second brightness pixel Pa2 passes through the first path pixel Pb1, the ray does not have brightness and path corresponding to the real object. This causes a noise defect in a three-dimensional image displayed by the integral photography type three-dimensional display device.

This concern may be removed by making light substantially perpendicularly leave the liquid crystal panel 110*b* using the high-condensing backlight unit. Further, to further remove this concern and take a margin of condensation of the backlight unit, the liquid crystal panel 110*b* and the path control panel 120 include first and second blocking portions 119 and 129, respectively. In FIG. 4, the first blocking portion 119 is located at the second substrate 117. Alternatively, the first blocking portion 119 may be located at the first substrate 116.

When the first and second blocking portions 119 and 129 are spaced apart with a distance D1 and have the same width D2, it is desirable that a ray passing through the first brightness pixel Pa1 at an edge of the first brightness pixel Pa1 does not pass through the second path pixel Pb2. To do this, a leaving angle of the ray from the liquid crystal panel 110*b* or a incident angle of the ray on the path control panel 129 may be within an angle following an expression, $\theta=\arctan(D2/D1)$. For example, when the backlight unit has condensing property for a maximum angle of light emitted from the backlight unit to be about a 10 degree angle, a relationship of the distance D1 and the width D2 may be determined according to an expression, $(D2/D1)=\tan(10°)$. According to this expression, the arrangement of the first and second blocking portions 119 and 129 and the condensing property of the backlight unit may be appropriately adjusted.

Figure 5A:
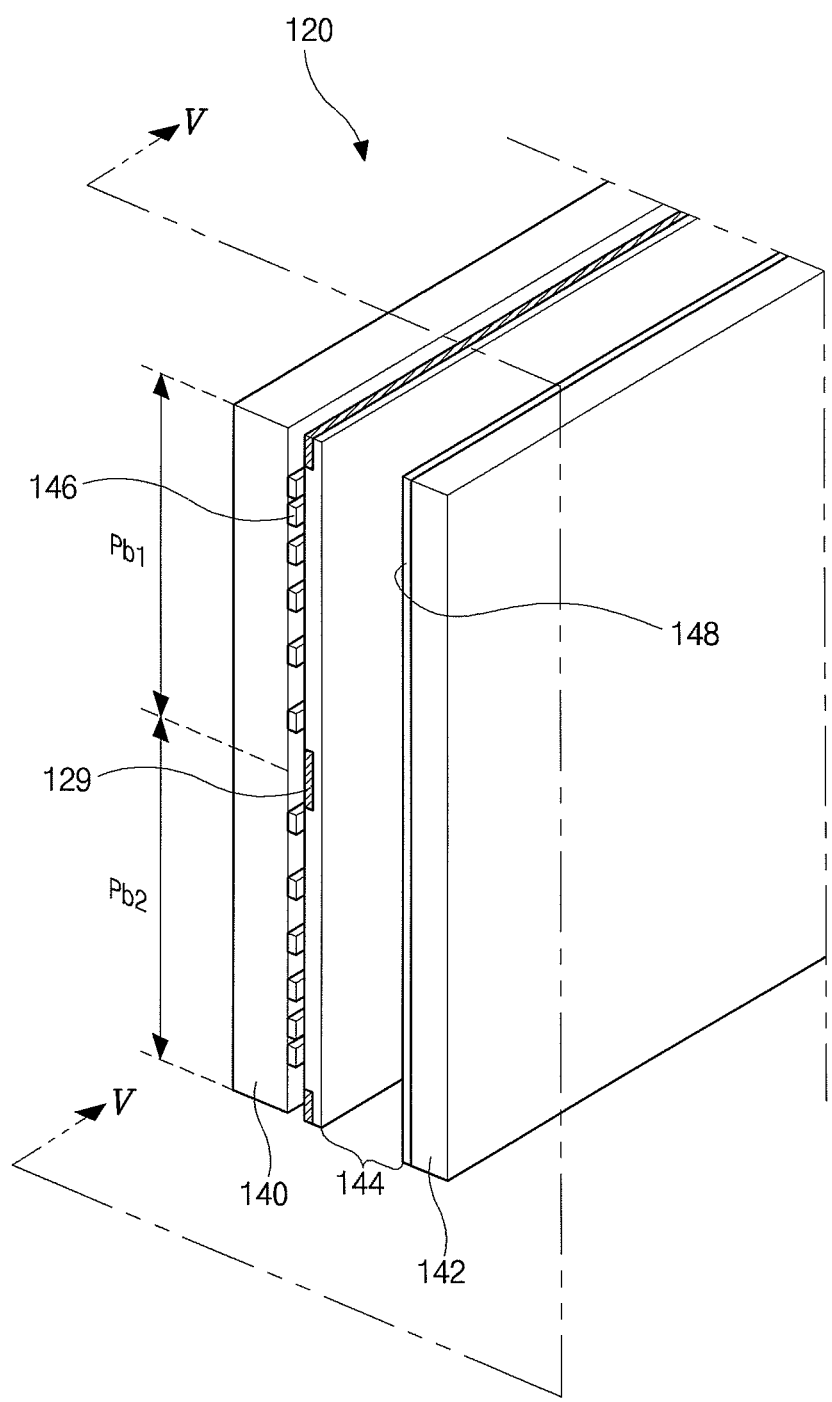
FIG. 5A is a perspective view illustrating a part of a path control panel of an integral photography type three-dimensional display device according to the first embodiment of the present disclosure.
Figure 5B:
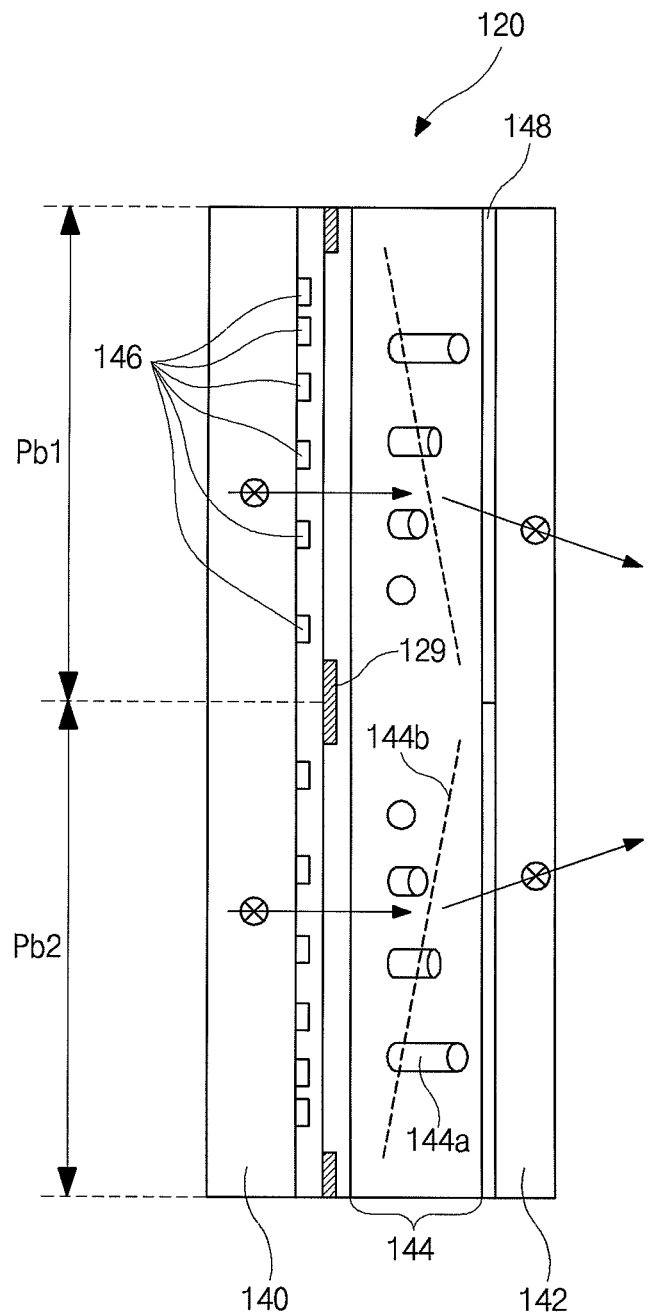
FIG. 5B is a cross-sectional view taken along a line V-V of FIG. 5A.

FIG. 5A is a perspective view illustrating a part of a path control panel of an integral photography type three-dimensional display device according to the first embodiment of the present disclosure, and FIG. 5B is a cross-sectional view taken along a line V-V of FIG. 5A.

Referring to FIGS. 5A and 5B, the path control panel 120 may use liquid crystal material. The path control panel 120 includes third and fourth substrates 140 and 142 and a second liquid crystal layer 144 between the third and fourth substrates 140 and 142. The path control panel 120 includes first and second path pixels Pb1 and Pb2 corresponding to the first and second brightness pixels (Pa1 and Pa2 of FIG. 4), respectively.

Each of the first and second path pixels Pb1 and Pb2 includes a plurality of first electrodes 146 on an inner surface of the third substrate 140. A second blocking portion 129 may be located at a boundary portion between the first and second path pixels Pb1 and Pb2. The second blocking portion 129 may be located on the first electrodes 146.

Even though not shown in the drawings, the first electrodes 146 of each of the first and second path pixels Pb1 and Pb2 are connected to a switching element such as a thin film transistor. A voltage applied to the first electrodes 146 is controlled according to operation of the switching element. A first insulating layer may be located between the first electrodes 146 and the second blocking portion 129. Further, a second insulating layer may be located between the second blocking portion 129 and the second liquid crystal layer 144. A first alignment layer contacting the second liquid crystal layer 144 may be located on the inner surface of the third substrate 140. Further, a second alignment layer contacting the second liquid crystal layer 144 may be located on an inner surface of the fourth substrate 142. The first and second alignment layers may be initially align liquid crystal molecules 144*a* of the second liquid crystal layer 144 substantially in parallel with a plane of the third and fourth substrates 140 and 142.

In FIG. 5A, the second blocking portion 129 is located between the first electrodes 146 and the second liquid crystal layer 144. Alternatively, the second blocking portion 129 may be located between the third substrate 140 and the first electrodes 146 or at the same layer as the first electrodes 146.

The first electrodes 146 may have a rod shape and be parallel. Distances between adjacent two first electrodes 146 may not be the same but different. For example, the distances may increase or decrease in a direction of one side portion to an opposing side portion of the path pixels Pb1 and Pb2.

A second electrode 148 as a common electrode may be located on an entire surface of the fourth substrate 142.

Voltages are supplied to the first electrodes 146 and the second electrode 148, and an electric field is induced and operates the second liquid crystal layer 144. The electric field changes according to arrangement of the first electrodes 146, and thus alignment of the liquid crystal molecules 144*a* of the second liquid crystal layer 144 changes.

For example, when comparing a first region where the distance between adjacent two first electrodes 146 is large and a second region where the distance between adjacent two first electrodes 146 is small, the electric field at the second region has a component perpendicular to the plane of the substrates 140 and 142 and an intensity more than those of the electric field at the first region. Based upon this, the electric field is varied according to positions, and thus alignment of the liquid crystal molecules 144*a* is varied according to positions. Accordingly, retardation of the second liquid crystal layer 144 is also varied according to positions. This variation of the retardation may cause a retardation plane 144*b* in the second liquid crystal layer 144.

In other words, when a ray passes through the second liquid crystal layer 144, a phase of the ray changes. Further, when the retardation of the second liquid crystal layer 144 is varied according to positions, not only the phase change but also a path change occurs. This path change is similar to refraction at a boundary of two media having different refraction index. Accordingly, the second liquid crystal layer 144 having variation of the retardation may be considered as a lens where the retardation plane 144*b* is a medium boundary.

Referring to FIG. 5B, by appropriately arranging the first electrodes 146, the retardation plane 144*b* may be an oblique line with respect to the plane of the third and fourth substrates 140 and 142. Accordingly, a ray incident on the path control panel 120 refracts through the retardation plane 144*b*.

Because an oblique angle of the retardation plane 144*b* with respect to the plane of the third and fourth substrates 140 and 142 changes according to the voltage applied to the first electrodes 146, a refraction angle of the path control panel 120 and the path of the ray passing through the path control panel 120 can be controlled.

Further, because different voltages can be applied to the first electrodes 146 of the first and second path pixels Pb1 and Pb2, paths of the rays incident on the path control panel 120 can be controlled separately through the corresponding pixels. For example, when a first voltage is applied to the first electrodes 146 of the first path pixel Pb1 and a second voltage is applied to the first electrodes 146 of the second path pixel Pb2, rays perpendicularly incident on the first and second path pixels Pb1 and Pb2, respectively, refract toward the boundary of the first and second path pixels Pb1 and Pb2 and are condensed at a point to form a voxel.

Figure 6B:
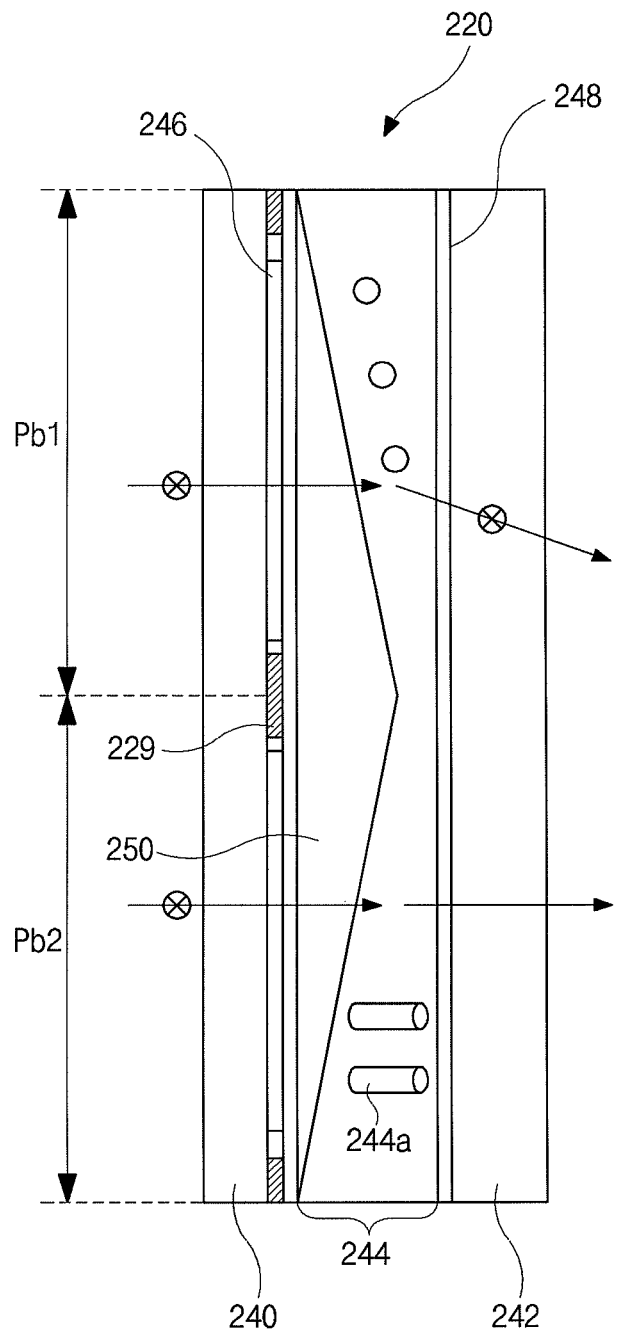
FIG. 6B is a cross-sectional view taken along a line VI-VI of FIG. 6A.

FIG. 6A is a perspective view illustrating a path control panel of an integral photography type three-dimensional display device according to a second embodiment of the present invention, and FIG. 6B is a cross-sectional view taken along a line VI-VI of FIG. 6A.

Referring to FIGS. 6A and 6B, the path control panel 220 may have a different structure from the path control panel of FIGS. 5A and 5B. The integral photography type three-dimensional display device of the second embodiment may be similar to that of the first embodiment except for the path control panel.

The path control panel 220 may include third and fourth substrates 240 and 242 and a second liquid crystal layer 244 between the third and fourth substrates 240 and 242. The path control panel 220 includes first and second path pixels Pb1 and Pb2 corresponding to the first and second brightness pixels (Pa1 and Pa2 of FIG. 4), respectively.

Each of the first and second path pixels Pb1 and Pb2 includes a first electrode 246 on an inner surface of the third substrate 240. A second blocking portion 229 may be located at a boundary portion between the first and second path pixels Pb1 and Pb2. The second blocking portion 229 may be located at the same layer as the first electrode 246.

Even though not shown in the drawings, the first electrode 246 of each of the first and second path pixels Pb1 and Pb2 is connected to a switching element such as a thin film transistor. A voltage applied to the first electrode 246 is controlled according to operation of the switching element. An insulating layer may be located between the second liquid crystal layer 244, and the first electrode 246 and the second blocking portion 229.

In FIGS. 6A and 6B, the second blocking portion 229 is located at the same layer as the first electrode 246. Alternatively, the second blocking portion 229 may be located between the third substrate 240 and the first electrode 246 or on the first electrode 246.

A prism 250 may be located between the first electrode 246 and the second liquid crystal layer 244. The prism 250 may have a material having a first refraction index. The prism 250 may have a trigonal shape on the first and second path pixels Pb1 and Pb2. Upper surfaces of the prism 250 are oblique with respect to a plane of the third and fourth substrates 240 and 242.

A second electrode 248 as a common electrode may be located on an entire surface of the fourth substrate 242.

A first alignment layer contacting the second liquid crystal layer 244 may be located on the upper surfaces of the prism 250. Further, a second alignment layer contacting the second liquid crystal layer 244 may be located on an inner surface of the fourth substrate 242.

Voltages are supplied to the first electrode 246 and the second electrode 248, and an electric field is induced and operates the second liquid crystal layer 244. The prism 250 and the second liquid crystal layer 244 refracts a ray according to a refraction index difference between the prism 250 and the second liquid crystal layer 244. Because a refraction index of the second liquid crystal layer 244 is varied according to the induced electric field, a path of the ray is controlled according to the voltage applied to the first electrode 246.

For example, referring to FIG. 6B, when a first voltage is applied to the first electrode 246 of the first path pixel Pb1 and the second liquid crystal layer 244 on the first path pixel Pb1 has a second refraction index different from the first refraction index, a ray perpendicularly incident on the first path pixel Pb1 of the path control panel 220 refracts and leaves the path control panel 220 obliquely. The path of the ray leaving the path control panel 220 depends on amplitude of the first voltage.

When a second voltage is applied to the first electrode 246 of the second path pixel Pb2 and the second liquid crystal layer 244 on the second path pixel Pb2 has a third refraction index identical to the first refraction index, a ray perpendicularly incident on the second path pixel Pb2 of the path control panel 220 does not refract and leaves the path control panel 220 perpendicularly.

The rays passing through the first and second path pixels Pb1 and Pb2 are condensed at a point to form a voxel.

As described above, the refraction index of the second liquid crystal layer 244 is varied according to amplitude of the voltage applied to the first electrode 246 of each path pixel, and the path of the ray incident on each pixel of the path control panel 220 is controlled according to the voltage of each pixel.

Because different voltages can be applied to the first electrodes 246 of the first and second path pixels Pb1 and Pb2, paths of rays incident on the path control panel 120 can be controlled separately through the corresponding pixels.

In the embodiments of the present invention, the integral photography type three dimensional display device includes the brightness control panel controlling the brightnesses the incident rays and the path control panel controlling the paths of the incident rays. Accordingly, the three-dimensional image consisting of the partial images integrated can be given sufficient depth range, and thus the three-dimensional image having natural depth information can be displayed.

It will be apparent to those skilled in the art that various modifications and variations can be made in the display device and a method of displaying an image of embodiments of the invention without departing from the spirit or scope of the invention. Thus, it is intended that embodiments of the invention cover the modifications and variations of this invention provided they come within the scope of the appended claims and their equivalents.

What is claimed is:

1. An integral photography type three-dimensional display device, comprising:
  a brightness control panel including a plurality of brightness pixels, wherein each of the plurality of brightness pixels control a brightness of a ray leaving the brightness control panel according to first image data having brightness information and supplied to each of the plurality of brightness pixels; and
  a path control panel including a plurality of path pixels, wherein each of the plurality of path pixels control a corresponding refraction angle of the ray leaving each of the plurality of brightness pixels according to second image data, such that the plurality of brightness pixels corresponding to the refraction angle are condensed at a point to form a voxel, wherein the second image data having path information are supplied to each of the plurality of path pixels, and wherein the first image data is different from the second image data.

2. The device according to claim 1, wherein the plurality of brightness pixels correspond to the plurality of path pixels, respectively.

3. The device according to claim 1, wherein the rays leaving the plurality of path pixels are condensed to form a voxel.

4. The device according to claim 1, wherein the brightness control panel includes a liquid crystal display device and a projector.

5. The device according to claim 4, wherein the liquid crystal display device includes:

a liquid crystal panel including first and second substrates facing each other, a first liquid crystal layer between the first and second substrates, and a first blocking portion between adjacent brightness pixels; and a backlight unit emitting the ray to the liquid crystal panel.

6. The device according to claim 5, wherein the ray is emitted from the backlight unit within about a 10 degree angle with respect to a line perpendicular to the liquid crystal panel.

7. The device according to claim 6, wherein the path control panel includes a second blocking portion between adjacent path pixels, and wherein the first and second blocking portion are arranged for the ray incident on one of the plurality of brightness pixels to be incident on a corresponding one of the plurality of path pixels.

8. The device according to claim 7, wherein the ray incident on the path control panel is incident on the path control panel within about an angle, $\theta=\arctan(D2/D1)$, where D1 is a distance between the first and second blocking portions and D2 is a width of each of the first and second blocking portions.

9. The device according to claim 1, wherein the path control panel includes:

third and fourth substrates facing each other;

a plurality of first electrodes in each of the plurality of brightness pixels on an inner surface of the third substrate;

a second electrode on an inner surface of the fourth substrate;

a second liquid crystal layer between the plurality of first electrodes and the second electrode; and a second blocking portion between adjacent path pixels.

10. The device according to claim 9, wherein the second liquid crystal layer is initially aligned substantially in parallel with the third and fourth substrates.

11. The device according to claim 9, wherein the plurality of first electrodes are parallel, and wherein distances between adjacent first electrodes are varied.

12. The device according to claim 1, wherein the path control panel includes:

third and fourth substrates facing each other;

a first electrode in each of the plurality of brightness pixels on an inner surface of the third substrate;

a prism on the first electrode;

a second electrode on an inner surface of the fourth substrate;

a second liquid crystal layer between the prism and the second electrode; and a second blocking portion between adjacent path pixels.

13. The device according to claim 1, wherein the brightness control panel includes a backlight unit and a liquid crystal panel, wherein the backlight unit emits first rays having uniform brightness, and wherein the first rays are incident on the liquid crystal panel, and, upon leaving the liquid crystal panel, become second rays having different brightness.

14. The device according to claim 1, wherein the corresponding refraction angle of the ray leaving each of the plurality of brightness pixels according to second image data is controlled by varying an applied voltage amplitude on a respective portion of an electrode to each of the plurality of path pixels, wherein the electrode is disposed on the path control panel.

15. The device according to claim 12, wherein the prism comprises an isosceles triangular prism having a vertex directing towards the second electrode.

* * * * *